United States Patent [19]

Matsuda

[11] Patent Number: 4,749,535
[45] Date of Patent: Jun. 7, 1988

[54] METHOD AND APPARATUS FOR FORMING PROFILED PLASTIC PRODUCTS INVOLVING EXTRUSION, ROLLER SHAPING AND CUTTING

[76] Inventor: Yasuo Matsuda, 11-8, Kashidanishi 1-chome, Higashiosaka-shi, Osaka, Japan

[21] Appl. No.: 847,391

[22] Filed: Apr. 2, 1986

[30] Foreign Application Priority Data

Apr. 5, 1985 [JP]  Japan .................................. 60-73205
Jul. 10, 1985 [JP]  Japan .................................. 60-152752

[51] Int. Cl.⁴ ...................... B29C 47/00; B29C 53/04; B29B 11/02
[52] U.S. Cl. .................................. 264/151; 264/210.2; 264/285; 264/DIG. 66; 425/296; 425/310
[58] Field of Search ............ 264/151, 210.2, DIG. 66, 264/285; 425/388, 294, 296, 311, 310

[56] References Cited

U.S. PATENT DOCUMENTS

| | | | |
|---|---|---|---|
| 2,582,294 | 1/1952 | Stober | 425/296 X |
| 2,734,245 | 2/1956 | Chamberlain | 264/151 |
| 2,895,170 | 7/1959 | Carlile | 264/151 |
| 3,011,217 | 12/1961 | Carlson, Jr. | 264/53 |
| 3,221,364 | 12/1965 | Bailey et al. | 425/310 X |
| 3,250,834 | 5/1966 | Collins | 264/53 |
| 3,478,138 | 11/1969 | Friesner | 264/151 X |
| 3,622,418 | 11/1971 | Black et al. | 264/151 X |
| 3,966,373 | 6/1976 | Johnson | 264/151 X |
| 4,336,010 | 6/1982 | Thompson | 425/310 X |
| 4,563,320 | 1/1986 | Morgan | 264/151 |

FOREIGN PATENT DOCUMENTS

2133485  12/1972  France ................................ 264/151

*Primary Examiner*—Philip Anderson
*Attorney, Agent, or Firm*—Wenderoth, Lind & Ponack

[57] ABSTRACT

An apparatus for molding of plastic products in which a softened plastic material is extruded from an extruder in the shape of belts or rods, the extruded material is introduced onto a main molding roll having an outer surface with a contour of the piece to be molded and the plastic material is formed into a shape corresponding to the outer surface of the main molding roll by utilizing the fluidity of the plastic material, followed by rapid cooling, to produce a plastic product having a curved shape.

11 Claims, 5 Drawing Sheets

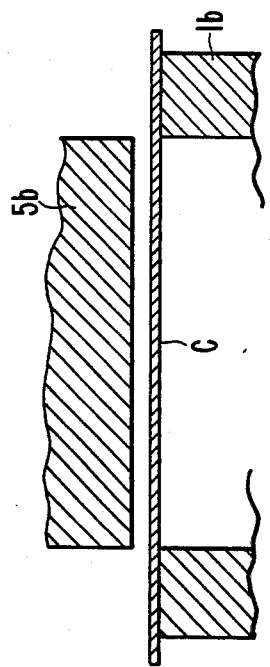
FIG. 2
(PRIOR ART)
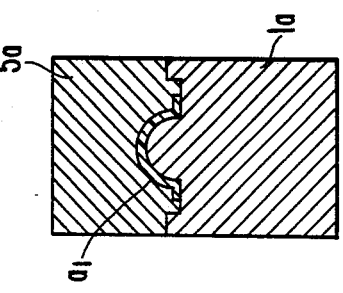
FIG. 3
(PRIOR ART)
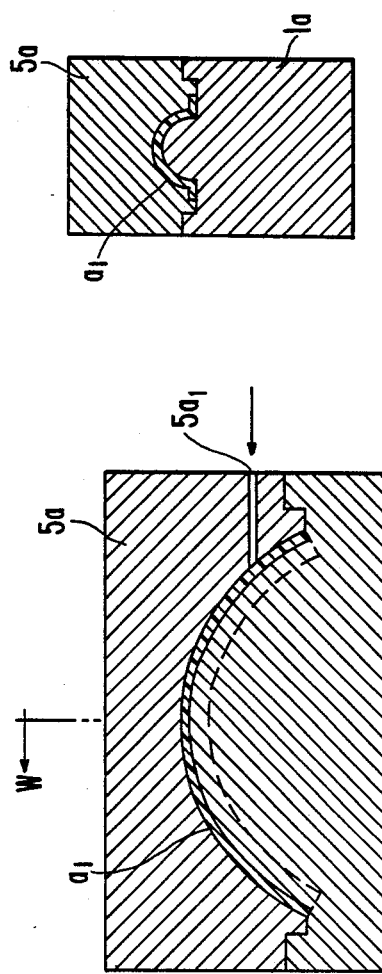
FIG. 1
(PRIOR ART)
FIG. 4
(PRIOR ART)
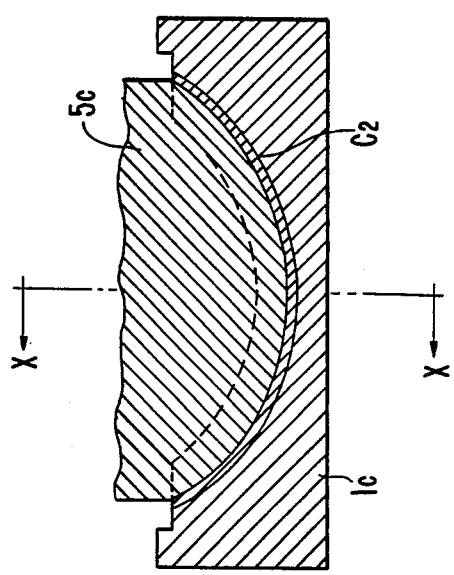
FIG. 5
(PRIOR ART)
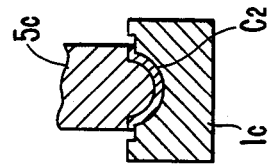
FIG. 6
(PRIOR ART)

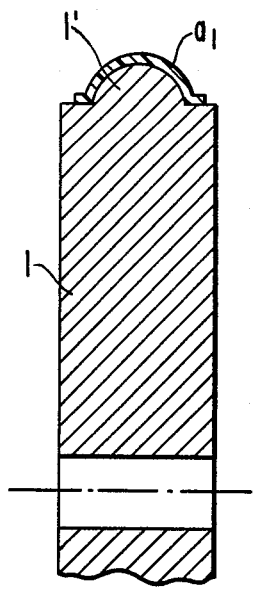
FIG. 9
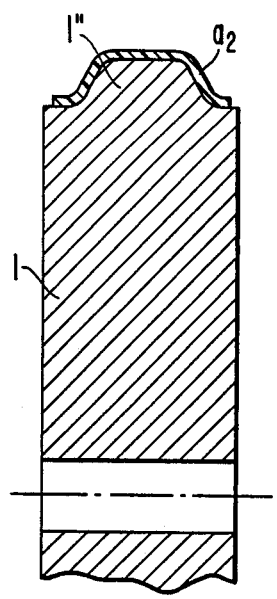
FIG. 10
FIG. 11
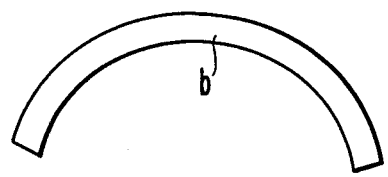
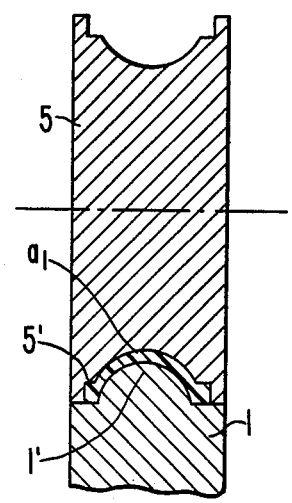
FIG. 14
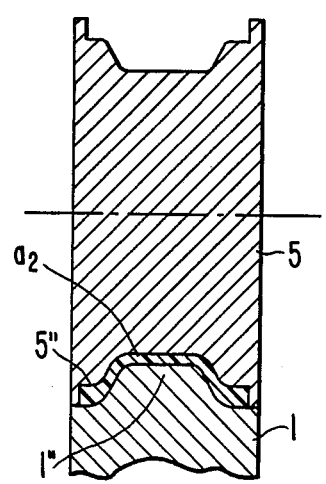
FIG. 15

METHOD AND APPARATUS FOR FORMING PROFILED PLASTIC PRODUCTS INVOLVING EXTRUSION, ROLLER SHAPING AND CUTTING

FIELD OF THE INVENTION

The present invention relates to an apparatus for molding plastic products. More particularly, it relates to an apparatus for molding plastics to produce a plastic product having a curved shape such as a mudguard for bicycles, etc., with the use of a main molding roll.

BACKGROUND OF THE INVENTION

For the production of plastic products by molding, there is conventionally used a molding apparatus containing two metal molds, i.e., a male mold and a female mold facing each other, between which plastic materials are poured to form a plastic product having a desired shape. In the conventionally used apparatus for molding, since two metal molds are always required, the production of the male and female molds having complex shapes is troublesome and requires skilled technique and a long time for production, which results in high expense. Meanwhile, also in case of the production of molded products using metal plates, male and female molds are conventionally required. For the production of molded products using metal plates, a metal plate having a desired shape is previously struck, and the struck metal plate is placed between male and female molds, to which a pressure is applied to give a molded product. In this case, depending on the desired shape of the curve, the molding is required to be effected for a plurality of times for the purpose of prevention of breakage of the materials and production of creases thereon. For the respective production steps, plural pairs of the combined molds having different sizes are required, thus resulting in a great expense in the production of the molds. Further, in the conventional production of metal plate-made products, finishing treatments such as polishing, plating, coating, etc. are required, and thereby, the number of production steps increases, which is economically disadvantageous.

Further explanation is given of the conventional production of a molded product having curved shape, with reference to the accompanying drawings. In the production of molded products having a curved shape such as a mudguard for bicycles, etc. using plastic, as shown in FIGS. 1 and 2, a male mold 1a and a female mold 5a are opposed to each other to form a space between them. Into the space a plastic material in a liquid state is poured through a hole 18 with the application of high pressure to form a product having a sectional shape $a_1$. In this case, the joint between the male mold 1a and the female mold 5a excluding the hole $5a_1$ is required to be air-tight. When the joint contains any gaps, the poured material leaks out from the gaps, and as a result a product of inferior quality is obtained. For preventing this, the portions forming the joint are required to be formed with high precision. In addition, the thickness of the product also depends on the precision of forming of the male and female molds. Thus, the precision of forming of the male and female molds determines the quality of the products, the production of the molds requires skilled technique and considerable expenses.

For the production of a molded product having curved shape using a metal plate, as shown in FIG. 3, a plate material c is inserted between a male mold 5b and a female mold 1b which constitute a metal mold for pressing, and the inserted material is struck by the action of the male mold 5b being inserted into the female mold 1b to give a metal plate $c_1$ having the desired shape. Then, the obtained metal plate $c_1$ is put into other molds having curved shapes, i.e. a male mold 5c and a female mold 1c, as shown in FIGS. 5 and 6, and pressed to produce a metal product $c_2$. In the press-molding as above described, however, when a product having a curved shape is produced, the starting material undergoes much distortion, and as a result, when the precision of the shape of the male mold 5c and the female mold 1c are inferior, many creases are produced in the product or the periphery of the product becomes irregular so that in many cases finishing treatments are needed. Further, in the press-molding, when the metal product $c_2$ having a largely curved shape is desired, as shown in FIG. 5, the pressing processes are effected in a series of steps so as to gradually press the material. If the pressing is effected once and radically, the elongation of the material does not follow the pressing force so that the material is cracked. As the result, the production of the molds is disadvantageously expensive.

As described above, in the production of various molded products of plastics or metal plates by using the conventional means for molding, the male and female molds are always required. The present invention provides a molding apparatus comprising one main molding roll. In the molding apparatus of the present invention, softened plastic materials which are in the shape of belts or rods are introduced onto the peripheral surface of the main molding roll, and thereby a plastic product having a shape according to that of the main molding roll can easily be obtained.

SUMMARY OF THE INVENTION

The present invention provides an apparatus for molding plastic materials to produce a plastic product having a curved shape such as a mudguard for bicycles, etc.

BRIEF DESCRIPTION OF THE DRAWINGS

FIG. 1 is a sectional view of the conventional molding means for plastic products;

FIG. 2 is a sectional view of FIG. 1, taken along the line W—W;

FIG. 3 is a sectional view of the conventional molding means for metal plate products wherein a metal plate material is struck into a desired shape by pressing;

FIG. 4 is a plan view of the metal plate struck by pressing in FIG. 3;

FIG. 5 is a sectional view of another conventional molding means for metal plate products formed by pressing;

FIG. 6 is a sectional view of the molding means of FIG. 5, taken along the line Z—Z;

FIG. 9 is a partial sectional view showing the molding apparatus in which plastic materials are molded on a main molding roll;

FIG. 10 is a partial sectional view showing the molding apparatus in which plastic materials are molded on another main modling roll;

FIG. 11 is a side view of a mudguard for bicycles as one embodiment of the product produced according to the present invention;

FIG. 14 is a sectional view showing another embodiment in which a plastic product is molded by a main molding roll and an auxiliary roll;

FIG. 15 is a sectional view showing another embodiment in which a plastic product is molded by another main molding roll and another auxiliary roll;

DETAILED DESCRIPTION OF THE INVENTION

The present invention will be explained in detail in reference with the accompanying drawings.

Figure 8:
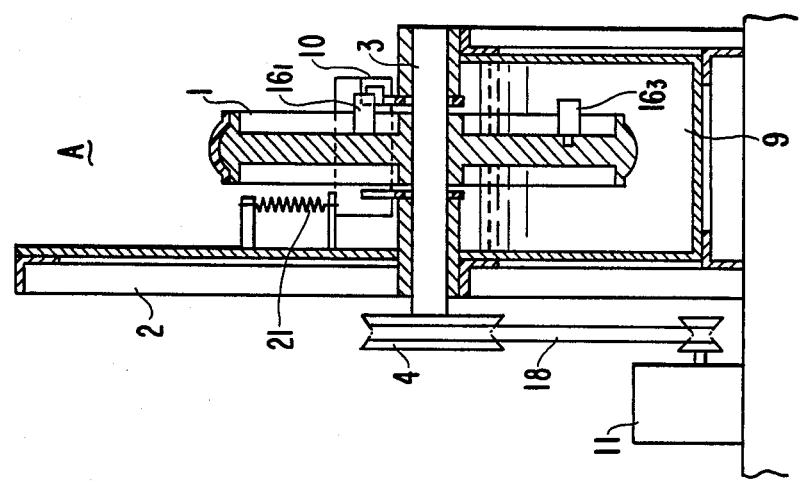
FIG. 8 is a sectional view of the molding apparatus of FIG. 7, taken along the line Y—Y of FIG. 7.
Figure 7:
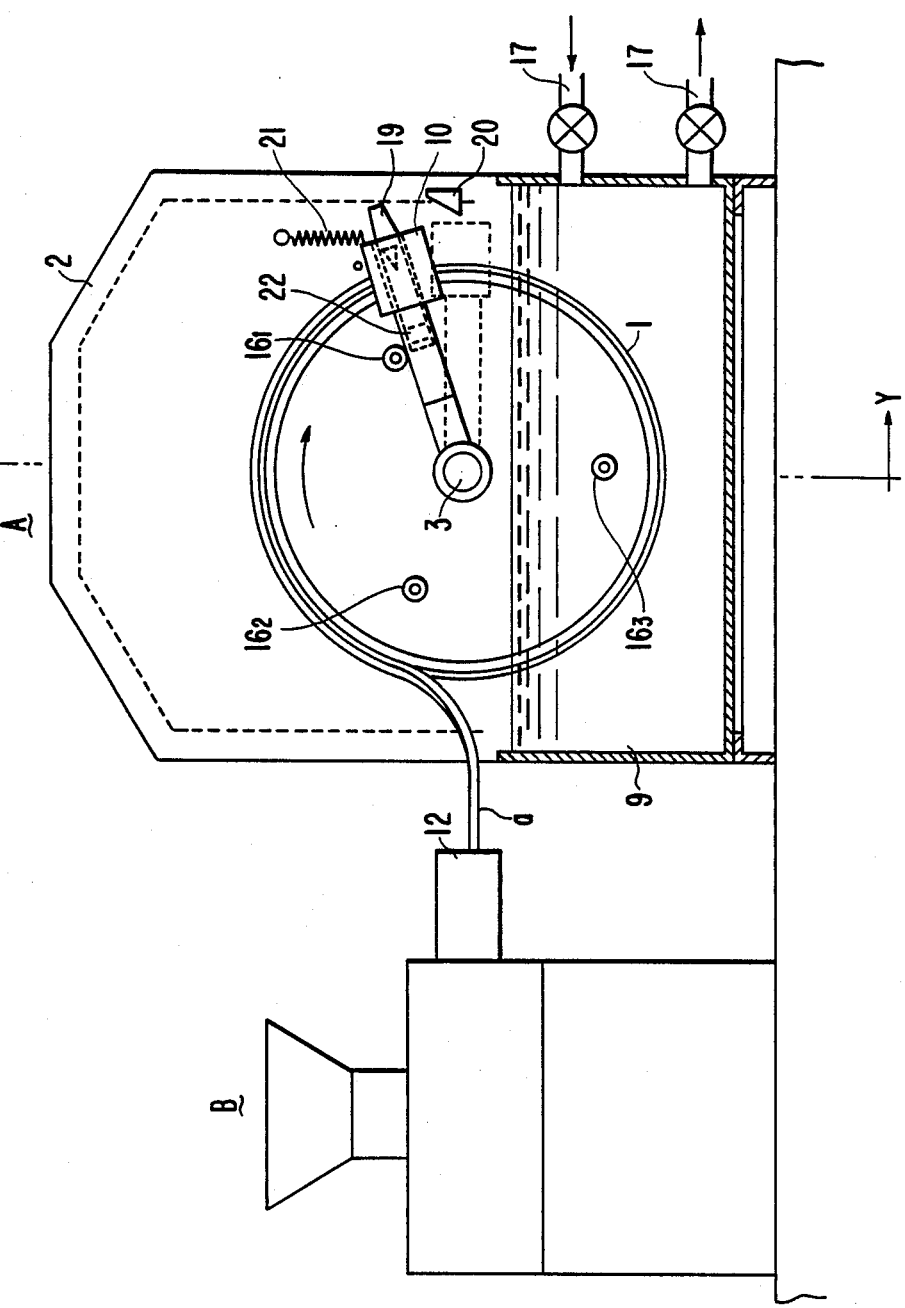
FIG. 7 is a sectional view showing the essential part of the molding apparatus of the present invention.

In the molding apparatus A shown in FIGS. 7 and 8, a main molding roll 1 the circumferential surface of which has a desired sectional shape is supported by a horizontal shaft 3 on a frame 2. On one end portion of the shaft 3 a pulley 4 is fixed. Between the pulley 4 and a driving pulley which is on an end of an output spindle of a motor 11 provided below the pulley 4, a belt is provided, and thereby the main molding roll 1 is rotated. On the shaft 3 is mounted a cutting means 10 facing the outer peripheral surface of the main molding roll 1. On the cutting means 10 is provided a operating portion 19 which contains a cutter facing the outer peripheral surface of the main molding roll 1. The operating portion 19 moves radially against the force of a spring in the direction of the shaft 3 of the main molding roll 1. By the movement of the operating portion 19, the tip of the cutter moves sufficiently close to the surface of the main molding roll 1 so as to cut a fixed length from the plastic product on the periphery of the roll 1.

The cutting means 10 moves, during a cutting operation, at the same rotational speed as the roll 1 by being pushed by pins $16_1$, $16_2$, $16_3$ and so on which are provided on the side of the main molding roll 1. When the operating portion 19 is pushed in close contact with an inclined surface of a projection 20 provided on the side of the frame 2, the cutter is moved in the direction of the plastic product to cut it.

As soon as the cutting operation is completed, the cutting means 10 is released from the contact with the pins $16_1$, and is returned to the original position on the main molding roll 1 by the action of a spring 21 which is connected between the frame 2 and the cutting means 10. The pins $16_1$, $16_2$, $16_3$ and so on are provided on the side of the main molding roll 1 at a fixed interval corresponding to the length of the product to be cut from the molded material.

Around the lower portion of the main molding roll 1, a water tank 9 supported by the frame 2 is provided. The lower half portion of the roll 1 is immersed in cold water filling the water tank 9. To the tank 9 are connected cycling pipes 17 leading to a water-supply means, whereby cold water is always supplied.

To one side of the molding apparatus A is provided an extruder B for extruding plastic materials and which contains a heating means for softening the plastic materials, and a die 12 freely exchangeable depending on the shape of the main molding roll 1. The softened plastic material is extruded through the die 12 by the application of high pressure. The shape of the material (a) to be extruded through the die 12 of the extruder B is selected depending on the sectional shape of the periphery of the main molding roll 1, for example, a shape of a rod or a belt, or a shape similar to that of the outer periphery of the main molding roll 1, and the material (a) is supplied onto the outer periphery of the roll 1 at a speed equal to the speed of the circumferential surface of the roll 1. The supplied material (a) which has been heated in the extruder B is placed on the outer periphery of the roll 1 in a softened state so that the material (a) is formed in a shape according to the shape of the peripheral surface of the roll 1.

The shape of the outer periphery of the roll 1 is selected depending on the use or object of the product, and according to this shape, the shape of the die 12 is determined. For example, as shown in FIGS. 9 and 10, when the sectional shape of the roll 1 is a semi-circle having a projecting portion 1', the product having a shape of $a_1$ is obtained, and when it is a trapezoid having a projecting portion 1", the product having a shape of $a_2$ is obtained. The material which has formed into the shape as shown in FIG. 9 or 10 on the outer periphery of the main molding roll 1 moves together with the roll 1 and is cut by the cutting means 10 operating at a predetermined circumferential position.

Explaining the cutting operation in detail, when the starting end of the material (a) placed on the main molding roll 1 slightly passes the cutting means 10, the pin $16_1$ on the side of the roll 1 contacts the supporting portion of the cutting means 10 so as to rotate the cutting means 10 together with the roll 1 in the direction as shown by the arrow. Then the operating portion 19 of the cutting means 10 engages the projection 20 on the frame 2 to push the operating portion 19 in the direction of the shaft 3, whereby the cutter on the tip of the operating portion 19 cuts the material (a). On the completion of the cutting operation, the pin $16_1$ is aligned with a groove portion 22 which moves together with the operating portion 19 toward the shaft 3, and thereby the engagement between the pin $16_1$ and the cutting means 10 is released. The pin $16_1$ is further rotated with the roll 1, and the cutting means 10 is returned to the initial position by the spring 21, and the pin $16_2$ reaches the original position of the pin $16_1$. Thereafter, the same operation as above is repeated.

The uncured product which is cut by the cutting means 10 is immersed in the water in vessel 9 and is rapidly cooled by contact with the cold water therein, whereby the product (b) having a curved shape as shown in FIG. 11 is produced.

According to the present invention, the shape of the obtained product is not limited to that as above obtained, and there can be obtained products having various shapes by exchanging the die 12 and/or the main molding roll 1.

In the molding apparatus A as above described, a cooling means in the form of the water vessel is used, but alternatively there can be used other means such as cold water-spraying means, cold air-spraying means, etc.

As to the cutting means, which is supported on the shaft 3 of the main molding roll 1 and moves with the roll 1 through a predetermined angle to effect the cutting operation during the movement, there can be used other cutting means than the above example. For example, the cutting means can be fixed on the frame 2 and the cutting operation may be effected by operating the cutter intermettently by application of pressure from air, oil, etc.

Figure 13:
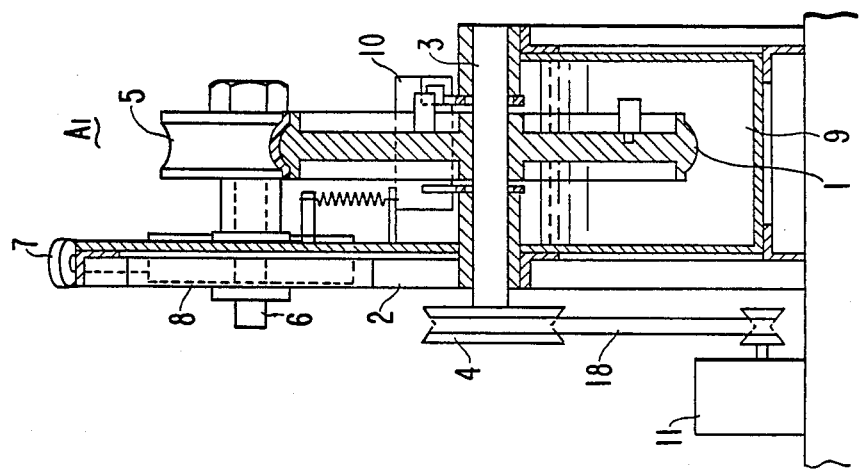
FIG. 13 is a sectional view of the molding apparatus of FIG. 12, taken along the line Z—Z of FIG. 12.
Figure 12:
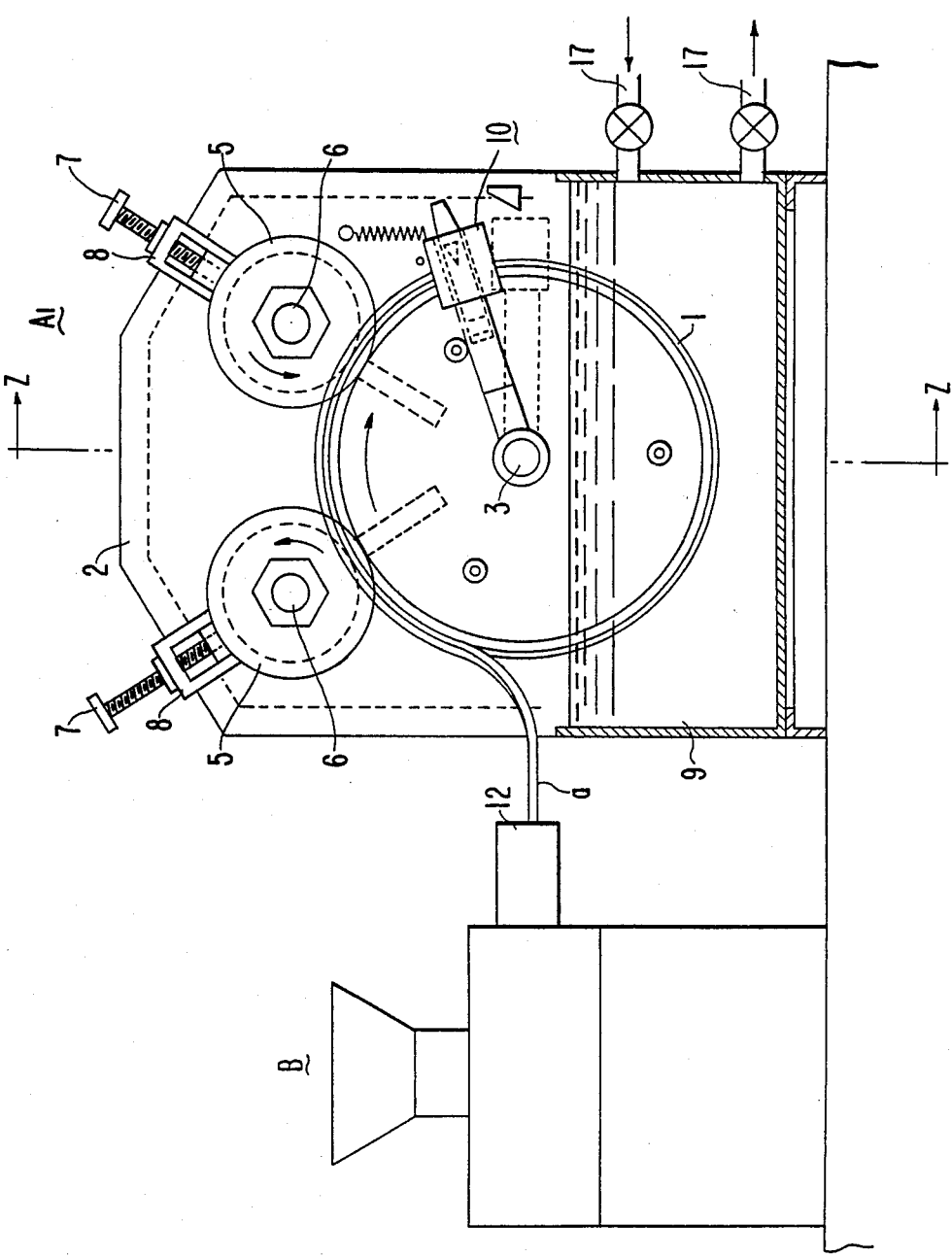
FIG. 12 is a sectional view showing the essential parts of the molding apparatus according to another embodiment.

Another embodiment in the form of a molding apparatus $A_1$ is shown in FIGS. 12 and 13. In the molding apparatus $A_1$, which comprises the same essential parts as the molding apparatus A, a main molding roll 1 which is freely rotatable is supported by a shaft 3 on a frame 2. One or more auxiliary molding rolls 5 which are in contact with the outer periphery of the main molding roll 1 are freely rotatably supported by shafts 6 which are parallel with the shaft 3. The shafts 6 are mounted on guide members 8 which extend radially of the shaft 3 fixed to the frame 2. By rotation of threaded control knobs 7 by which the shafts 6 are moved along the guide members 8, the contact pressure between the auxiliary molding rolls 5 and the main molding roll 1 can be adjusted. The remainder of the construction is the same as the molding apparatus A. In the production of the molded product with the use of the auxiliary molding rolls 5 and the main molding roll 1, the product having a sectional shape $a_1$ can be obtained by the combination of the main molding roll containing a semi-circular projecting portion 1' and the auxiliary molding roll 5, as shown in FIG. 14, while the product having a sectional shape $a_2$ can be obtained by the combination of the main molding roll 1 containing a trapezoid-shaped projecting portion 1'' and the auxiliary molding roll 5, as shown in FIG. 15. As seen in these Figures, the sectional shapes $a_1$ and $a_2$ contain portions 5' and 5'' having different thickness on the end portions, respectively. Thus, with the use of the auxiliary molding rolls 5, there can be obtained molded product having different shapes on the inner and outer sides.

Figure 16:
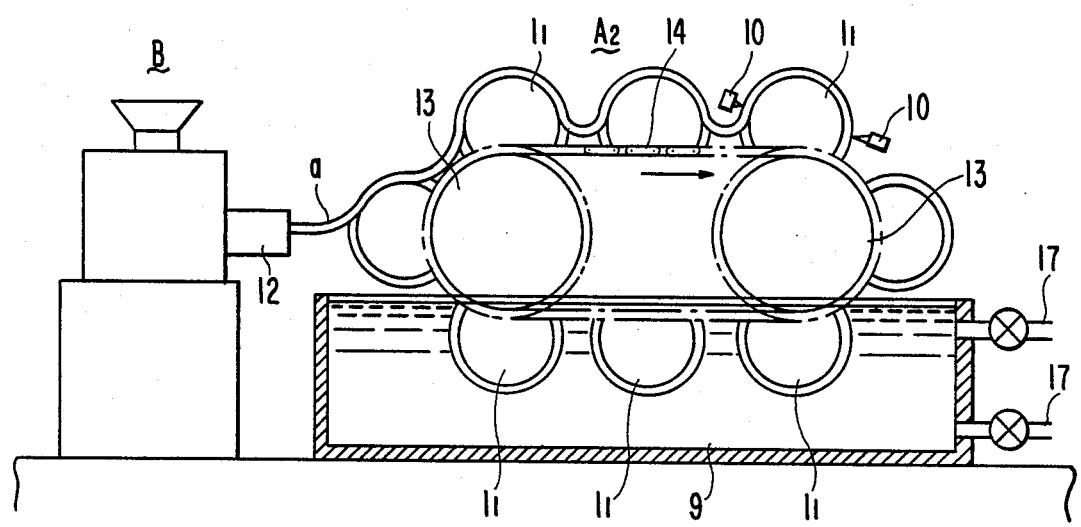
FIG. 16 is a sectional view of the molding apparatus comprising a plurality of main molding rolls.

In another embodiment as shown in FIG. 16, the molding apparatus $A_2$ comprises a number of molds successively arranged. The main molds $1_1$ which do not rotate separately are arranged, at equal intervals, on a chain 14 extending around two sprockets 13. Below the sprockets 13 is provided a water tank 9, and the molded material is cut from the end of the extruded material and immersed in the water. in water In this case, since the main molds $1_1$ do not rotate individually, which is different from the main molding roll 1, the cutting of molded products is effected by placing two cutting means 10 along the periphery of the main molds $1_1$ and moving the cutting means at the same cyclic speed as the main molds. In this embodiment, although the number of the cutting means can be one, the provision of two cutting means can make the operation simpler. This is because the directions of the cutters can be made different according to the shape of the product. This construction is essentially within the the scope of the present invention.

Figure 17:
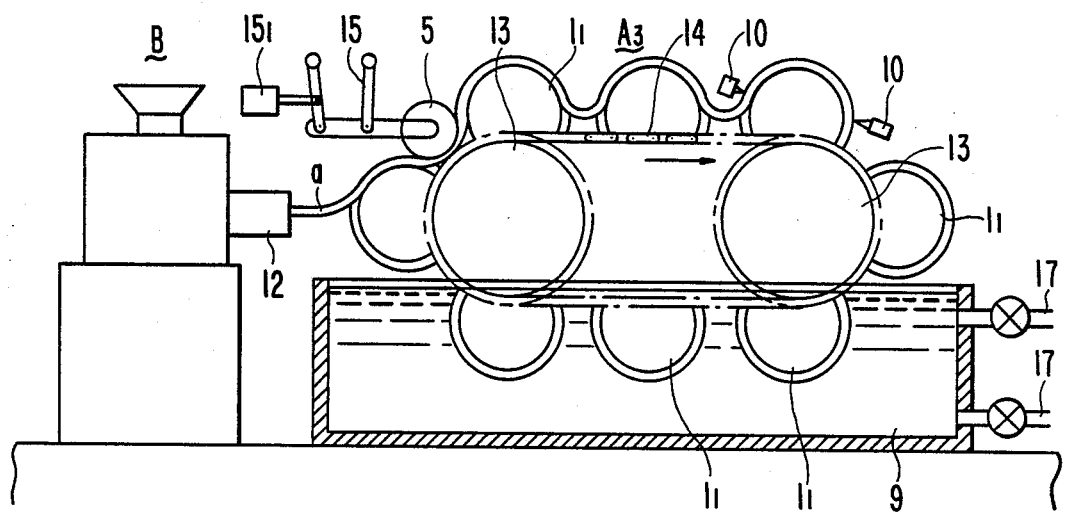
FIG. 17 is a sectional view of another molding apparatus comprising a plurality of main molding rolls.

In another embodiment as shown in FIG. 17, to the molding apparatus $A_2$ is added an auxiliary molding roll 5 which is in contact with the successive molds $1_1$ and is supported by a movable mechanism 15, which is connected with a cylinder $15_1$ operating with a liquid material (e.g. air oil). The combination of the auxiliary roll 5 and each mold $1_1$ can form a product having different outer and inner shapes. In any case, the auxiliary molding rolls can be exchanged for changing the shape and size of the product.

According to the present invention, the drawbacks of the conventional molding apparatus, in which the starting plastic material in a softened state can be molded only by sealing it into an air-tight mold, can be overcome. In the present invention, when a molded product having similar inner and outer shapes is desired, the softened material can be molded by using a single molding roll which is rotating. When a molded product having a different overall shape and size is desired, the single main molding roll may be exchanged. Further, when a molded product having different inner and outer shapes is to be produced, the molding is effected by one main molding roll and at least one auxiliary molding roll which is in contact therewith. Also in this case, since there is no elaborate relationship between the main molding roll and the auxiliary molding rolls, the production of the molds is remarkably easy. Furthermore, for repairing the apparatus, without repairing the molds themselves, the main molding roll or the auxiliary molding roll may be exchanged into new ones which are inexpensive in the production, Besides, the comparison with the conventional molding means for molding metal plates, according to the present invention, the number of molding steps and the number of molds is less, and in addition, the production of the molding roll to be used as a mold is easy and inexpensive.

When the rotating molding roll is not used, a number of molds having optional shapes may be placed on a chain and moved, as shown in FIGS. 16 and 17, whereby there can continuously be obtained a molded product having not only a curved shape, as shown in FIG. 11, but also other optional shapes.

What is claimed is:

1. A method for molding a plastic product, comprising continuously extruding a softened plastic material onto the outer peripheral surface of a roll means which has a contour extending in a direction parallel to the rotational axis of the roll means and corresponding to the cross-sectional profile of the product to be molded, and which outer peripheral surface is moving upwardly so as to carry the extruded material upwardly over the top of the roll means, after the material has conformed to the contour, cutting the extruded material into desired lengths, and then removing it from the roll means and cooling it.

2. An apparatus for molding plastic products, comprising:
a main molding roll means having an outer peripheral surface having a contour extending in a direction parallel to the rotational axis of said roll means and corresponding to the cross-sectional profile of the product to be molded;
a frame;
a horizontal shaft means on said frame on which said roll means is mounted for rotation on said frame;
rotating means connected to said roll means for rotating said roll means on said frame;
a cooling means positioned immediately under said roll means;
an extruder means for continuously extruding a softened plastic material onto the outer peripheral surface of said roll means at a position where said outer peripheral surface is moving upwardly for carrying the extruded material upwardly over the top of said roll means for causing the plastic material to conform to the shape of the peripheral surface of said roll means; and
a cutting means operatively associated with said roll means and movable along a portion of the periphery of said roll means downstream, relative to the direction of movement of the extruded material along the periphery of said roll means, of said extruder means, said cutting means being movable into engagement with the peripheral surface of said roll means for cutting the plastic material lying on the peripheral surface of said roll means.

3. An apparatus as claimed in claim 2 in which said roll means comprises a single main molding roll.

4. An apparatus as claimed in claim 3 further comprising at least one auxiliary roll means engaged with the peripheral surface of said main molding roll and having a contour for shaping the outer surface of the extruded material lying on the peripheral surface of said main molding roll.

5. An apparatus as claimed in claim 2 in which said cooling means is a cold water tank.

6. An apparatus as claimed in claim 2 in which said cooling means is a cold water spraying device.

7. An apparatus as claimed in claim 2 in which said roll means comprises a single main molding roll and said horizontal shaft means is a single horizontal shaft, and said cutting means is supported on said horizontal shaft for movement along the periphery of said molding roll.

8. An apparatus as claimed in claim 7 in which said cutting means comprises a cutter movable on said cutting means radially of said main molding roll toward and away from the peripheral surface of said main molding roll, engaging means positioned along the path of said cutting means as it moves around said main molding roll and engagable by said cutter for urging said cutter toward said main molding roll, spring means connected to said cutting means opposing movement of said cutting means in the direction of rotation of said main molding roll, and abutment means on said main molding roll for abutting said cutting means and moving it with the rotation of said main molding roll until said cutter engages said engaging means, said cutting means including means for releasing the abutment of said abutment means with said cutting means when said cutter is moved toward said main molding roll.

9. An apparatus as claimed in claim 2 in which said cutting means is mounted on said frame.

10. An apparatus as claimed in claim 2 in roll means comprises an endless chain, and a plurality of non-rotatable molding rolls mounted on said chain and moved along the path of said chain during movement of said chain.

11. An apparatus as claimed in claim 10 further comprising at least one auxiliary roll means engaged with the peripheral surface of said non-rotatable molding rolls and movable toward and away from the peripheral surfaces of said molding rolls as said rolls move along the path of said endless chain.

* * * * *